(12) United States Patent
Chen

(10) Patent No.: US 11,022,852 B2
(45) Date of Patent: Jun. 1, 2021

(54) DISPLAY PANEL AND DISPLAY DEVICE

(71) Applicants: HKC Corporation Limited, Guangdong (CN); Chongqing HKC Optoelectronics Technology Co., Ltd., Chongqing (CN)

(72) Inventor: Yu-Jen Chen, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 0 days.

(21) Appl. No.: 16/639,428

(22) PCT Filed: Dec. 13, 2017

(86) PCT No.: PCT/CN2017/115905
§ 371 (c)(1),
(2) Date: Feb. 14, 2020

(87) PCT Pub. No.: WO2019/033639
PCT Pub. Date: Feb. 21, 2019

(65) Prior Publication Data
US 2020/0272008 A1 Aug. 27, 2020

(30) Foreign Application Priority Data
Aug. 17, 2017 (CN) .......................... 201710704922.4

(51) Int. Cl.
*G02F 1/1362* (2006.01)
*G02F 1/1335* (2006.01)
(Continued)

(52) U.S. Cl.
CPC ...... *G02F 1/136286* (2013.01); *G02F 1/1368* (2013.01); *G02F 1/133514* (2013.01); *G02F 1/133707* (2013.01); *G02F 2201/123* (2013.01)

(58) Field of Classification Search
CPC .......... G02F 1/136286; G02F 1/13454; G02F 1/1345; G02F 1/13452; G02F 1/1339; H01L 2224/49171
See application file for complete search history.

(56) References Cited

U.S. PATENT DOCUMENTS

2007/0195254 A1   8/2007 Lee et al.
2015/0301370 A1*  10/2015 Moriwaki ............. G02F 1/1345
                                                                 349/42

FOREIGN PATENT DOCUMENTS

CN    101109874 A    1/2008
CN    101673003 A    3/2010
(Continued)

*Primary Examiner* — Angela K Davison
(74) *Attorney, Agent, or Firm* — Muncy, Geissler, Olds & Lowe, P.C.

(57) ABSTRACT

A display panel and a display device are provided. The display panel comprises: a first substrate, wherein a color filter layer is disposed on the first substrate; and a second substrate, wherein active switches are disposed on the second substrate. The second substrate comprises a display area and a fan-out area. A plurality of fan-out wires are disposed in the fan-out area. The fan-out area comprises a straight line portion, and the fan-out wire comprises a first straight line segment disposed in the straight line portion. A plurality of blocking members are disposed in the straight line portion, and the blocking members block a flow of a liquid.

13 Claims, 4 Drawing Sheets

(51) Int. Cl.
*G02F 1/1337* (2006.01)
*G02F 1/1368* (2006.01)

(56) References Cited

FOREIGN PATENT DOCUMENTS

| | | |
|---|---|---|
| CN | 102221760 A | 10/2011 |
| CN | 103309107 A | 9/2013 |
| CN | 205539852 U | 8/2016 |
| CN | 107329313 A | 11/2017 |
| KR | 10-2008-0022360 A | 3/2008 |

* cited by examiner

DISPLAY PANEL AND DISPLAY DEVICE

BACKGROUND

Technical Field

This disclosure relates to a technical field of a display, and more particularly relates to a display panel and a display device.

Related Art

The existing display generally performs the control based on an active switch, has many advantages, such as a thin body, the power-saving property, the radiationless property and the like, and has been widely used. The displays mainly include a liquid crystal display, an organic light-emitting diode (OLED) display, a quantum dot light emitting diode (QLED) display, a plasma display and the like. When viewed from the appearance structure, not only a flat type display but also a curved display are present.

The liquid crystal display device mainly includes a display panel and a backlight module. The working principle of the liquid crystal display device is to refract the light rays from the backlight module to produce a frame by placing liquid crystal molecules between two parallel substrates, and by applying a driving voltage to the two substrates to control the orientations of the liquid crystal molecules.

For the OLED display, using the self lighting of the organic light emitter diode to display has the advantages of the self lighting property, the wide viewing angle, the almost infinitely high contrast ratio, the low power-consumptive property, the very high response speed and the like.

The QLED display structure and the OLED technology are very similar to each other, and the main difference therebetween is that the light emitting center of the QLED is constituted by a quantum dot substance. In the structure thereof, electrons and holes on two sides are gathered in the quantum dot layer to form excitons and emit light through the reconstruction of the excitons.

However, an alignment film is usually coated between two opposing substrates to form a pretilt angle to facilitate the liquid crystal in having a constant tilt upon displaying. The alignment film is formed by the liquid, and the liquid may reflow to the display area to cause the display panel to have the quality and the reliability problems.

SUMMARY

An objective of this disclosure is to provide a display panel, in which the accurate formation of the alignment film can be easily controlled, and the display taste can be enhanced.

In order to solve the above problem, the disclosure provides a display panel.

A display panel and a display device are provided. The display panel comprises first substrate and a second substrate. A color filter layer is disposed on the first substrate. Active switches are disposed on the second substrate. The second substrate comprises a display area and a fan-out area. A plurality of fan-out wires are disposed in the fan-out area. The fan-out area comprises a straight line portion, and the fan-out wire comprises a first straight line segment disposed in the straight line portion. A plurality of blocking members are disposed in the straight line portion, and the blocking members block a flow of a liquid.

In one embodiment, a configuration location for an arrangement of the blocking member is between neighboring two of the first straight line segments, and the blocking member is disposed on a protrusion of the configuration location. In this embodiment, the blocking member is configured as a protrusion type obstruction, while the specific position of the configuration location of the blocking member is defined.

In one embodiment, a configuration location for an arrangement of the blocking member is between neighboring two of the first straight line segments, and the blocking member is disposed on a recessed groove of the configuration location. In this embodiment, the blocking member is configured as a recessed groove, while the specific position of the configuration location of the blocking member is defined.

In one embodiment, the blocking member is configured as an "S" shape, and the blocking members are successively connected together and disposed along a direction of the first straight line segment. This is the specific shape configuration of the blocking member projected on the horizontal plane. Since the "S" shaped blocking members are successively connected and disposed along the direction of the first straight line segment, the utilization of the space of the configuration location are maximized, while the formation of the "S" area is utilized to achieve the blocking effect, so that the liquid will not expand quickly.

In this embodiment, the blocking member is provided by using a second straight line segment, and an extension line of the second straight line segment and an extension line of the first straight line segment are crossly disposed according to a predetermined angle. This is the specific shape configuration of the blocking member projected on the horizontal plane. The running direction of the first straight line segment (that is, the fan-out wire of the straight line portion) reaches the display area. If the second straight line segment and the first straight line segment are parallel to each other (do not cross each other), the better blocking effect cannot be provided under the same configurations of the blocking members. Thus, the second straight line segment perpendicular to the first straight line segment is adopted in this configuration location to solve the phenomenon, in which the straight line portion has the large layout gap and the empty location to cause the liquid to spread easily.

In one embodiment, the angle is equal to 90 degrees. The second straight line segment is horizontal and is perpendicular to the first straight line segment, and the second straight line segment is perpendicular to the flow direction, along which the liquid within the configuration location spreads to the display area. The provision of the blocking members in the horizontal direction can conveniently and simultaneously achieve the blocking effect on the liquid, and prevent the display quality of the display panel from being damaged.

In one embodiment, the arrangement directions of the blocking member corresponding to a horizontally neighboring $(N-1)^{th}$ configuration location and the blocking member corresponding to an $N^{th}$ configuration location are different from each other, and the arrangement directions of the blocking member corresponding to the $(N-1)^{th}$ configuration location and the blocking member corresponding to an $(N+1)^{th}$ configuration location are the same; and the blocking members corresponding to neighboring two of the configuration locations form an acute angle and an obtuse angle with the horizontal line. At this time, the blocking members in the two neighboring configuration locations form an inverse-V shaped overall form, and the inverse-V shape structures are utilized to form the regular change to block the flow of the liquid.

In one embodiment, the blocking member is provided by using a single layer metal, the blocking member is provided by using a double layer metal, the blocking member is provided by using an amorphous silicon layer, or the blocking member is provided by using a pixel electrode layer. These are the adoptable material of the blocking member. Using the material forming the active switches facilities the material utilization, and has the high process availability.

In one embodiment, the blocking members in the two neighboring configuration locations form an inverse-V shaped overall form.

In one embodiment, the blocking members intersecting the first straight line segment are continuously or separately disposed in the corresponding configuration locations, or combined with other blocking members.

In one embodiment, the tilt angles of the blocking members are the same.

In addition, the disclosure also provides a display panel including a first substrate and a second substrate. A color filter layer is disposed on the first substrate, and active switches are disposed on the second substrate. The second substrate comprises a display area and a fan-out area, and a plurality of fan-out wires are disposed in the fan-out area. The fan-out area comprises a straight line portion, and the fan-out wire comprises a first straight line segment disposed in the straight line portion. A plurality of blocking members are disposed in the straight line portion, and the blocking members block a flow of a liquid. A configuration location for an arrangement of the blocking member is between neighboring two of the first straight line segments, and the blocking member is disposed on a protrusion or a recessed groove of the configuration location. The blocking member is configured as an "S" shape, and the blocking members are successively connected together and disposed along a direction of the first straight line segment; or the blocking member is provided by using a second straight line segment, and an extension line of the second straight line segment and an extension line of the first straight line segment are crossly disposed according to a predetermined angle. The blocking member is provided by using a single layer metal, the blocking member is provided by using a double layer metal, the blocking member is provided by using an amorphous silicon layer, or the blocking member is provided by using a pixel electrode layer.

In addition, the disclosure further provides a display device including a control component and the above-mentioned display panel.

In this disclosure, the blocking members are disposed in the straight line portion of the fan-out area on one side of the substrate disposed with the active switches to block the flow of the liquid by the blocking members and to solve the problem, in which the straight line portion has a large layout gap and an empty location to cause the easy expansion of the liquid that cannot be precisely controlled. Thus, it is possible to effectively block the reflow of the liquid for forming an alignment film, prevent the liquid from entering the display area, and improve the display taste and reliability.

BRIEF DESCRIPTION OF THE DRAWINGS

The embodiments will become more fully understood from the detailed description and accompanying drawings, which are given for illustration only, and thus are not limitative of the present invention, and wherein.

DETAILED DESCRIPTION OF THE INVENTION

Figure 1:
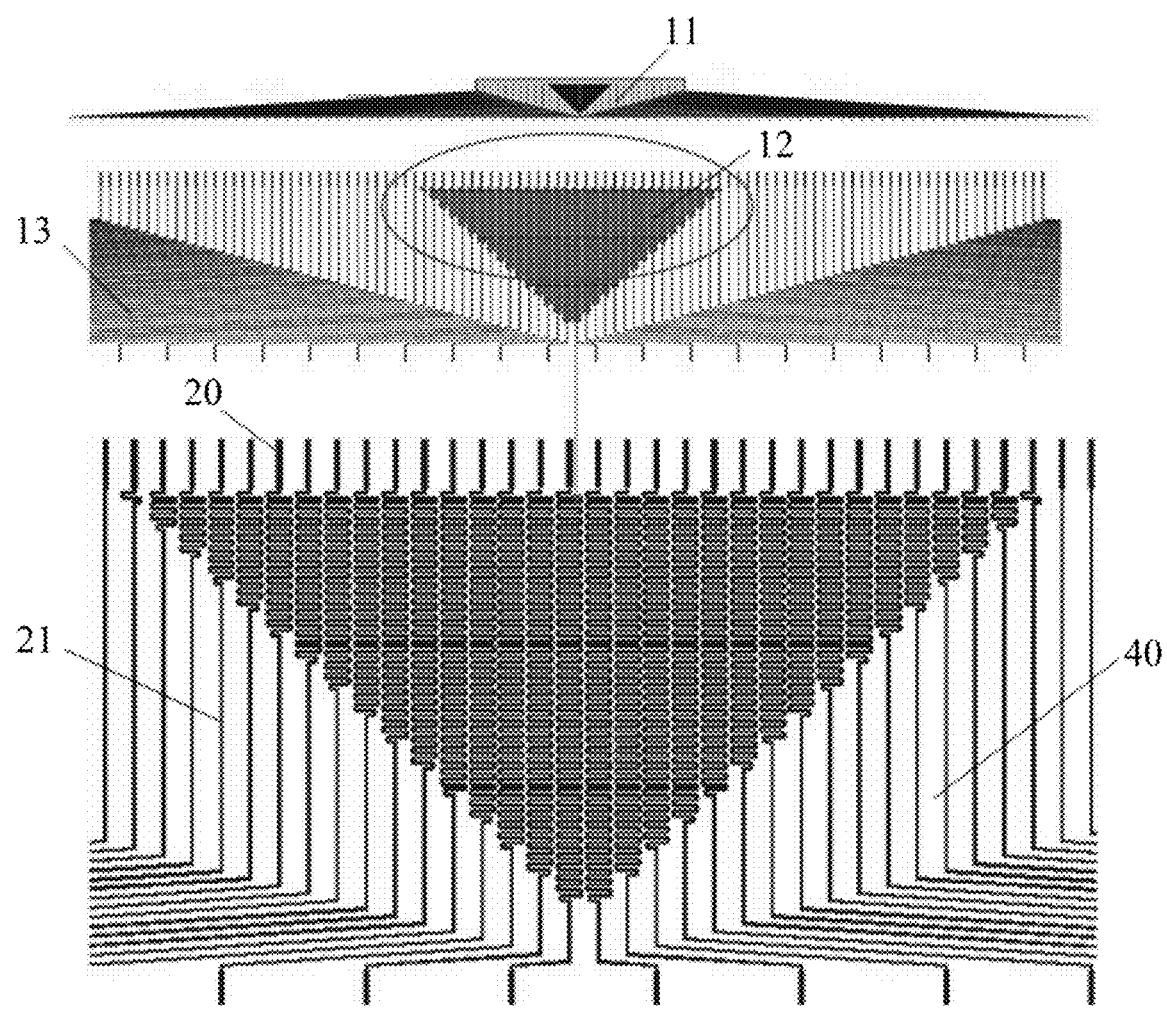
FIG. 1 is a view showing interconnections of a display panel of an embodiment of this disclosure.

Specific structures and function details disclosed herein are only for the illustrative purpose for describing the exemplary embodiment of this disclosure. However, this disclosure can be specifically implemented through many replacements, and should not be explained as being restricted to only the embodiment disclosed herein.

In the description of this disclosure, it is to be understood that the terms "center", "transversal", "up," "down," "left," "right," "vertical", "horizontal", "top," "bottom," "inside" and "outside" indicating the orientation or position relationships are the orientation or position relationships based on the drawing, are only provided for the purposes of describing this disclosure and simplifying the description, but do not indicate or imply that the directed devices or elements must have the specific orientations or be constructed and operated in the specific orientations, and thus cannot be understood as the restriction to this disclosure. In addition, the terms "first," and "second" are used for the illustrative purpose only and cannot be understood as indicating or implying the relative importance or implicitly specifying the number of indicated technical features. Therefore, the features restricted by "first" and "second" may expressly or implicitly comprise one or multiple ones of the features. In the description of this disclosure, unless otherwise described, the meaning of "multiple" comprises two or more than two. In addition, the terms "comprises" and any modification thereof intend to cover the non-exclusive inclusions.

In the description of this disclosure, it needs to be described that, unless otherwise expressly stated and limited, the terms "mount," "link" and "connect" should be broadly understood. For example, they may be the fixed connection, may be the detachable connection or may be the integral connection; may be the mechanical connection or may also be the electrical connection; or may be the direct connection, may be the indirect connection through a middle medium or may be the inner communication between two elements. It will be apparent to those skilled in the art that the specific meanings of the above terms in this application may be understood according to the specific conditions.

The terms used herein are for the purpose of describing only specific embodiments and are not intended to limit the exemplary embodiments. Unless the contexts clearly indicate otherwise, the singular form "one," "a" and "an" used here further intend to include plural forms. It should also be understood that the terms "comprising" and/or "including" are used herein to describe the features to describe the presence of stated features, integers, steps, operations, units and/or elements without excluding the presence or addition of one or more other features, integers, steps, operations, units, elements, and/or combinations thereof.

In the figures, the similar units are represented by the same reference numbers.

A display panel and a display device of this disclosure will be further described in detail with reference to embodiments of FIGS. 1 to 8.

Referring to FIGS. 1 to 7, the display panel according to an embodiment of this disclosure includes: a first substrate, wherein a color filter layer is disposed on the first substrate; and a second substrate, wherein active switches are disposed on the second substrate. The second substrate includes a display area and a fan-out (fan-out) area. Fan-out wires 20 are disposed in the fan-out area. The fan-out area includes a straight line portion 11. The fan-out wire 20 includes a first straight line segment 21 disposed in the straight line portion 11, blocking members 30 are disposed in the straight line portion 11, and the blocking members 30 block the flow of the liquid. The blocking members 30 are disposed in the straight line portion 11 of the fan-out area on one side of the substrate disposed with the active switches to block the flow of the liquid by the blocking members 30 and to solve the problem, in which the straight line portion 11 has a large layout gap and an empty location to cause the easy expansion of the liquid that cannot be precisely controlled. Thus, it is possible to effectively block the reflow of the liquid for forming an alignment film, prevent the liquid from entering the display area, and improve the display taste and reliability.

Specifically, in the thin film transistor liquid crystal display (TFT-LCD) field, a layer of PI is usually coated on the CF and array sides to form a pretilt angle, and this is advantageous to the liquid crystal in possessing a constant tilt upon displaying. The coating methods of the PI can be currently classified into two kinds (i.e., a PI printing method and a PI coating method). The process of the PI printing method is complex, and is mainly applied to the small-size panels. The PI coating method has high coating efficiency, and is applicable to large-size panels. However, with the enhancement of the market demand for the large-size narrow border products, the spray-typed PI coating method encounters the challenge, and the spraying accuracy needs to be further improved. In order to prevent the PI from reflowing to the AA area to cause the quality and the reliability problems of the cell, a PS stopper wall can be designed on the CF side to block the reflow of the PI. The stopper wall cannot be designed on the TFT side to prevent the reflow of the PI, and especially in the interface position of the fan-out area of the panel. Due to the design limit of the fan-out, some slant-line portions 13, "S" shaped portions 12 and straight line portions 11 are formed. The slant-line portion 13 and the "S" shaped portion 12 have a certain blocking effect due to the shape of the interconnection, and PI does not expand quickly. But the straight line portion 11 has the large layout gap and the empty location, so that the PI easily expands and cannot be precisely controlled. On the array side, adjusting the coating accuracy of the PI coating machine to control the coating of the PI while disposing the blocking member 30 in the straight line portion 11 further ease the reflow of the liquid forming the alignment film, and achieves the objective of preventing the liquid from entering the display area.

Specifically, the thin film transistors may be adopted as the active switches.

Figure 2:
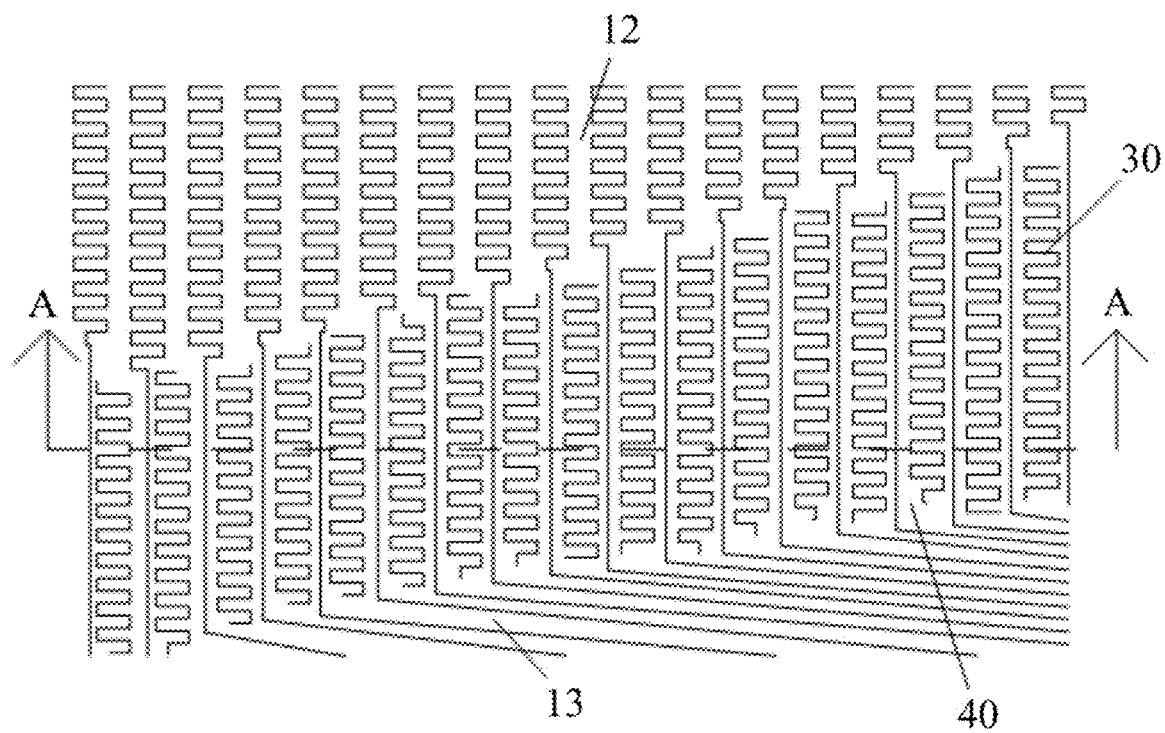
FIG. 2 is a structural view showing "S" shaped blocking members disposed in a straight line area of the display panel of an embodiment of this disclosure.

In another embodiment of this disclosure as shown in FIG. 2, the display panel includes: a first substrate, wherein a color filter layer is disposed on the first substrate; and a second substrate, wherein active switches are disposed on the second substrate. The second substrate includes a display area and a fan-out (fan-out) area. Fan-out wires 20 are disposed in the fan-out area. The fan-out area includes a straight line portion 11. The fan-out wire 20 includes a first straight line segment 21 disposed in the straight line portion 11, blocking members 30 are disposed in the straight line portion 11, and the blocking members 30 block the flow of the liquid. The blocking members 30 are disposed in the straight line portion 11 of the fan-out area on one side of the substrate disposed with the active switches to block the flow of the liquid by the blocking members 30 and to solve the problem, in which the straight line portion 11 has a large layout gap and an empty location to cause the easy expansion of the liquid that cannot be precisely controlled. Thus, it is possible to effectively block the reflow of the liquid for forming an alignment film, prevent the liquid from entering the display area, and improve the display taste and reliability.

Figure 6:
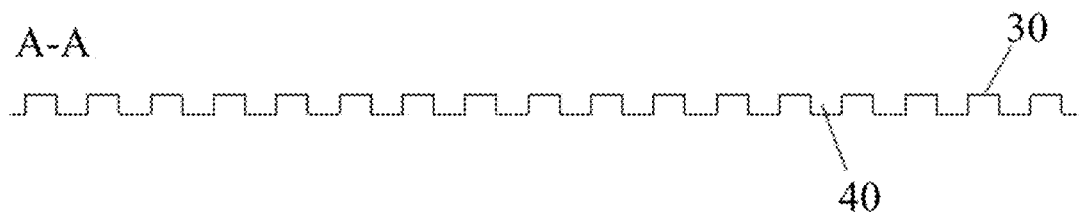
FIG. 6 is a protrusion type blocking member of the display panel of an embodiment of this disclosure.
Figure 7:
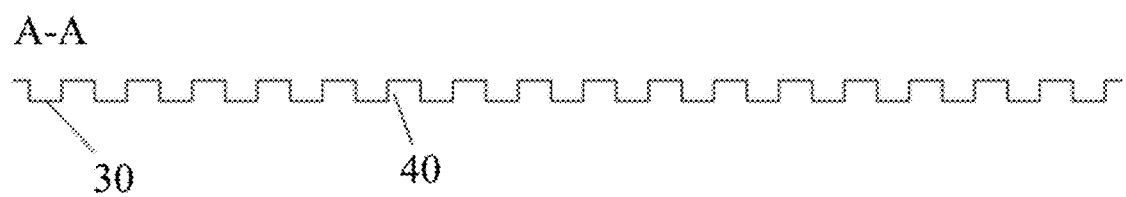
FIG. 7 is a recessed groove type blocking member of the display panel of an embodiment of this disclosure.

A configuration location 40 for the arrangement of the blocking member 30 is between two neighboring first straight line segments 21, and the blocking member 30 is disposed on the protrusion (as shown in FIG. 6) or in the recessed groove (as shown in FIG. 7) of the configuration location 40. The blocking member 30 is configured as an "S" shape, and the blocking members 30 are successively connected together and disposed along the direction of the first straight line segment 21. Since the "S" shaped blocking members 30 are successively connected and disposed along the direction of the first straight line segment 21, the utilization of the space of the configuration location 40 are maximized, while the formation of the "S" area is utilized to achieve the blocking effect, so that the liquid will not expand quickly. Of course, the "S" shaped blocking members 30 can be continuously disposed at the corresponding configuration locations 40, as shown in FIG. 2, and other implementation methods, such as the separate arrangement and the combination with other types of blocking members 30, may be adopted.

Figure 3:
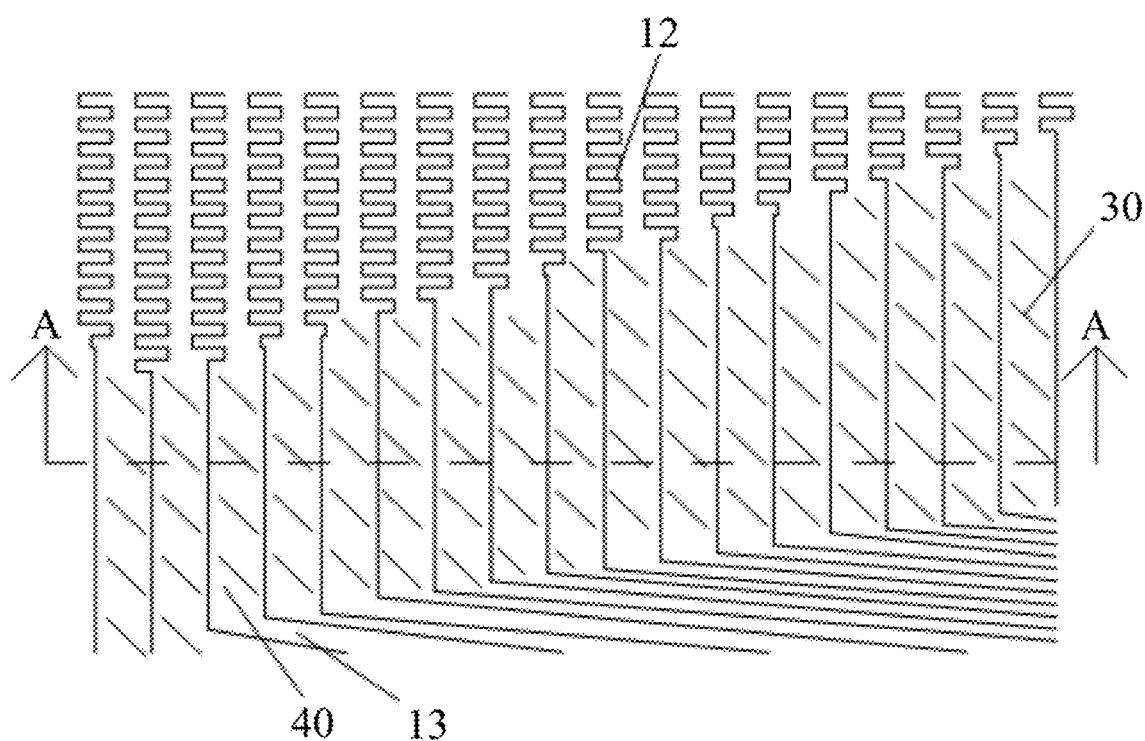
FIG. 3 is a structural view showing slant-line shaped blocking members disposed in a straight line area of the display panel of an embodiment of this disclosure.

In another embodiment of this disclosure as shown in FIG. 3, the display panel includes: a first substrate, wherein a color filter layer is disposed on the first substrate; and a second substrate, wherein active switches are disposed on the second substrate. The second substrate includes a display area and a fan-out (fan-out) area. Fan-out wires 20 are disposed in the fan-out area. The fan-out area includes a straight line portion 11. The fan-out wire 20 includes a first straight line segment 21 disposed in the straight line portion 11, blocking members 30 are disposed in the straight line portion 11, and the blocking members 30 block the flow of the liquid. The blocking members 30 are disposed in the straight line portion 11 of the fan-out area on one side of the substrate disposed with the active switches to block the flow of the liquid by the blocking members 30 and to solve the problem, in which the straight line portion 11 has a large layout gap and an empty location to cause the easy expansion of the liquid that cannot be precisely controlled. Thus, it is possible to effectively block the reflow of the liquid for forming an alignment film, prevent the liquid from entering the display area, and improve the display taste and reliability.

A configuration location 40 for the arrangement of the blocking member 30 is between two neighboring first straight line segments 21, and the blocking member 30 is disposed on the protrusion (as shown in FIG. 6) or in the recessed groove (as shown in FIG. 7) of the configuration location 40. The blocking member 30 is provided by using the second straight line segment, wherein an extension line of the second straight line segment and an extension line of the first straight line segment 21 are crossly disposed according to a predetermined angle. The running direction of the first straight line segment 21 (that is, the fan-out wire of the straight line portion) reaches the display area. If the second straight line segment and the first straight line segment 21 are parallel to each other (do not cross each other), the better blocking effect cannot be provided under the same configurations of the blocking members 30. Thus, the second straight line segment perpendicular to the first straight line segment 21 is adopted in this configuration location 40 to solve the phenomenon, in which the straight line portion 11 has the large layout gap and the empty location to cause the liquid to spread easily. As shown in FIG. 3, the corresponding blocking members 30 are kept at the same level in the configuration locations 40. Of course, the second straight line segment blocking members 30 crossing with the first straight line segments 21 can be continuously disposed in the corresponding configuration locations 40, as shown in FIG. 3, and other implementation methods, such as the separate arrangement and the combination with other types of blocking members 30, may be adopted.

Figure 4:
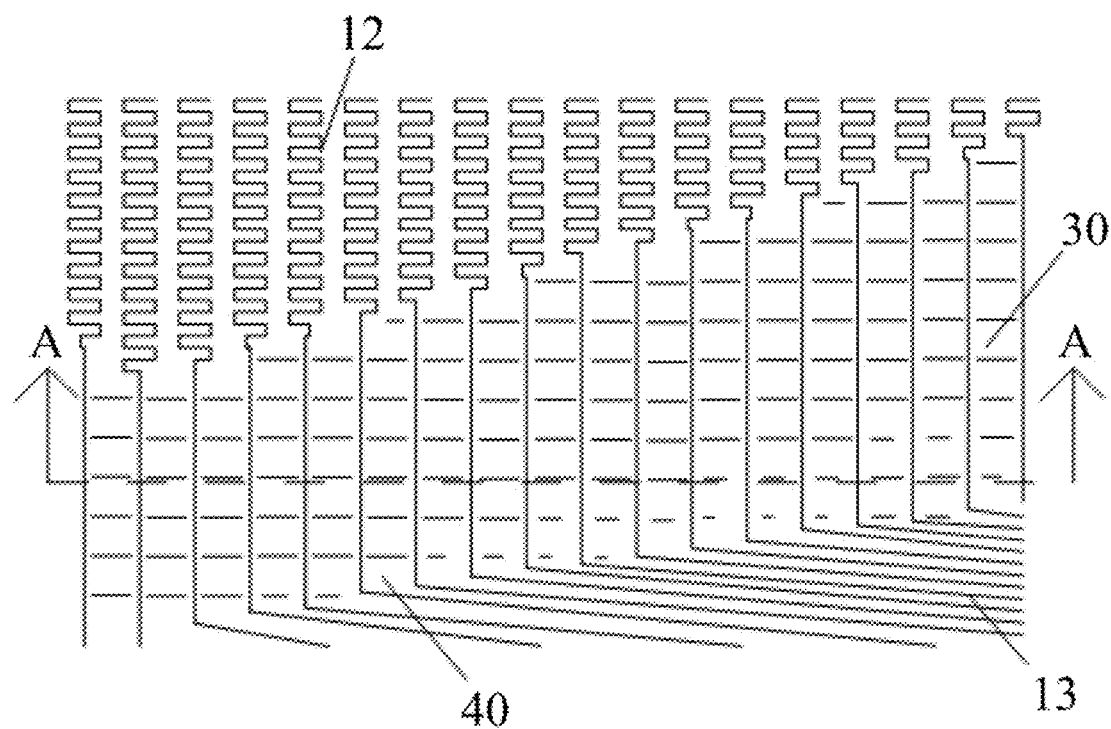
FIG. 4 is a structural view showing horizontal straight-line shaped blocking members disposed in a straight line area of the display panel of an embodiment of this disclosure.

In another embodiment of this disclosure as shown in FIG. 4, the display panel includes: a first substrate, wherein a color filter layer is disposed on the first substrate; and a second substrate, wherein active switches are disposed on the second substrate. The second substrate includes a display area and a fan-out (fan-out) area. Fan-out wires 20 are disposed in the fan-out area. The fan-out area includes a straight line portion 11. The fan-out wire 20 includes a first straight line segment 21 disposed in the straight line portion 11, blocking members 30 are disposed in the straight line portion 11, and the blocking members 30 block the flow of the liquid. The blocking members 30 are disposed in the straight line portion 11 of the fan-out area on one side of the substrate disposed with the active switches to block the flow of the liquid by the blocking members 30 and to solve the problem, in which the straight line portion 11 has a large layout gap and an empty location to cause the easy expansion of the liquid that cannot be precisely controlled. Thus, it is possible to effectively block the reflow of the liquid for forming an alignment film, prevent the liquid from entering the display area, and improve the display taste and reliability.

A configuration location 40 for the arrangement of the blocking member 30 is between two neighboring first straight line segments 21, and the blocking member 30 is disposed on the protrusion (as shown in FIG. 6) or in the recessed groove (as shown in FIG. 7) of the configuration location 40. The blocking member 30 is provided by using the second straight line segment, wherein an extension line of the second straight line segment and an extension line of the first straight line segment 21 are crossly disposed according to a predetermined angle, and the angle is equal to 90 degrees. The running direction of the first straight line segment 21 (that is, the fan-out wire of the straight line portion) reaches the display area. If the second straight line segment and the first straight line segment 21 are parallel to each other (do not cross each other), the better blocking effect cannot be provided under the same configurations of the blocking members 30. Thus, the second straight line segment perpendicular to the first straight line segment 21 is adopted in this configuration location 40 to solve the phenomenon, in which the straight line portion 11 has the large layout gap and the empty location to cause the liquid to spread easily. The second straight line segment is horizontal and is perpendicular to the first straight line segment 21, and the second straight line segment is perpendicular to the flow direction, along which the liquid within the configuration location 40 spreads to the display area. The provision of the blocking members 30 in the horizontal direction can conveniently and simultaneously achieve the blocking effect on the liquid, and prevent the display quality of the display panel from being damaged. As shown in FIG. 4, the corresponding blocking members 30 are kept at the same level in the configuration locations 40. Of course, the second straight line segment blocking members 30 perpendicular to the first straight line segments 21 can be continuously disposed in the corresponding configuration locations 40, as shown in FIG. 3, and other implementation methods, such as the separate arrangement and the combination with other types of blocking members 30, may be adopted.

Figure 5:
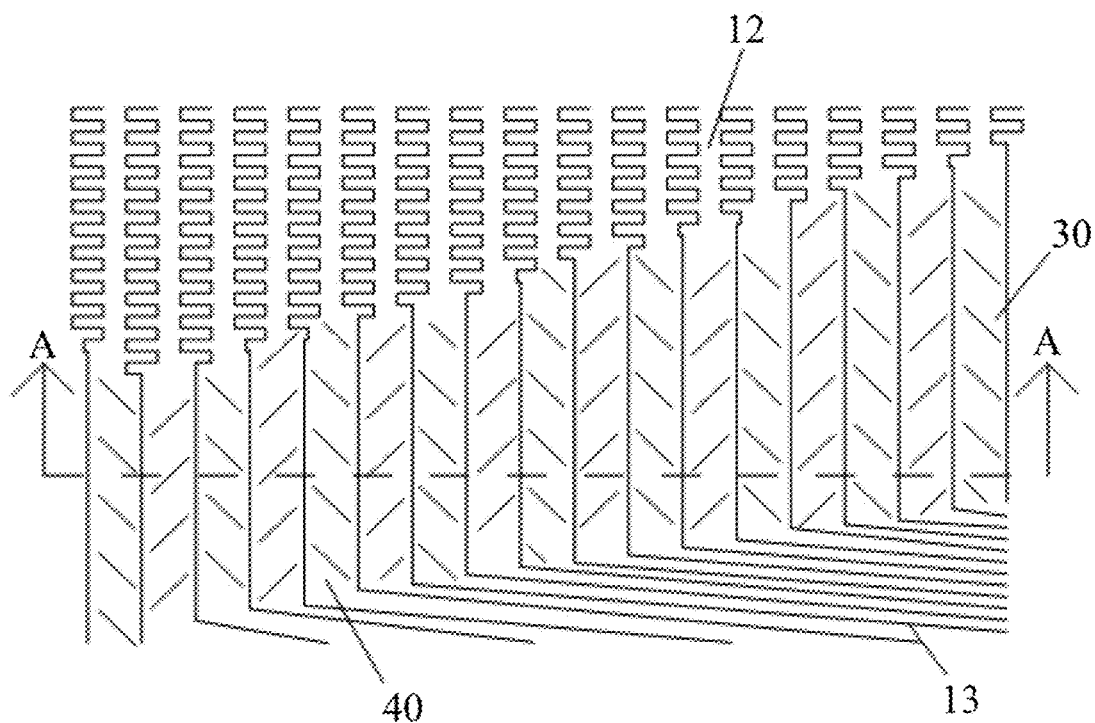
FIG. 5 is a structural view showing that blocking members constituting inverse-V shapes are disposed in a straight line area of the display panel of an embodiment of this disclosure.

In another embodiment of this disclosure as shown in FIG. 5, the display panel includes: a first substrate, wherein a color filter layer is disposed on the first substrate; and a second substrate, wherein active switches are disposed on the second substrate. The second substrate includes a display area and a fan-out (fan-out) area. Fan-out wires 20 are disposed in the fan-out area. The fan-out area includes a straight line portion 11. The fan-out wire 20 includes a first straight line segment 21 disposed in the straight line portion 11, blocking members 30 are disposed in the straight line portion 11, and the blocking members 30 block the flow of the liquid. The blocking members 30 are disposed in the straight line portion 11 of the fan-out area on one side of the substrate disposed with the active switches to block the flow of the liquid by the blocking members 30 and to solve the problem, in which the straight line portion 11 has a large layout gap and an empty location to cause the easy expansion of the liquid that cannot be precisely controlled. Thus, it is possible to effectively block the reflow of the liquid for forming an alignment film, prevent the liquid from entering the display area, and improve the display taste and reliability.

A configuration location 40 for the arrangement of the blocking member 30 is between two neighboring first straight line segments 21, and the blocking member 30 is disposed on the protrusion (as shown in FIG. 6) or in the recessed groove (as shown in FIG. 7) of the configuration location 40. The blocking member 30 is provided by using the second straight line segment, wherein an extension line of the second straight line segment and an extension line of the first straight line segment 21 are crossly disposed according to a predetermined angle. The running direction of the first straight line segment 21 (that is, the fan-out wire of the straight line portion) reaches the display area. If the second straight line segment and the first straight line segment 21 are parallel to each other (do not cross each other), the better blocking effect cannot be provided under the same configurations of the blocking members 30. Thus, the second straight line segment perpendicular to the first straight line segment 21 is adopted in this configuration location 40 to solve the phenomenon, in which the straight line portion 11 has the large layout gap and the empty location to cause the liquid to spread easily. The arrangement directions of the blocking member 30 corresponding to the horizontally neighboring $(N-1)^{th}$ configuration location 40 and the blocking member 30 corresponding to the $N^{th}$ configuration location 40 are different from each other. The arrangement directions of the blocking member 30 corresponding to the $(N-1)^{th}$ configuration location 40 and the blocking member 30 corresponding to the $(N+1)^{th}$ configuration location 40 are the same. The blocking members 30 corresponding to neighboring two configuration locations 40 form an acute angle and an obtuse angle with the horizontal line. At this time, the blocking members 30 in the two neighboring configuration locations 40 form an inverse-V shaped overall form, and the inverse-V shape structures are utilized to form the regular change to block the flow of the liquid. As shown in FIG. 3, the corresponding blocking members 30 are kept at the same level in the configuration locations 40. Of course, the second straight line segment blocking members 30 crossing with the first straight line segments 21 can be continuously disposed in the corresponding configuration locations 40, as shown in FIG. 3, and other implementation methods, such as the separate arrangement and the combination with other types of blocking members 30, may be adopted.

In another embodiment of this disclosure, the display panel includes: a first substrate, wherein a color filter layer is disposed on the first substrate; and a second substrate, wherein active switches are disposed on the second substrate. The second substrate includes a display area and a fan-out (fan-out) area. Fan-out wires 20 are disposed in the fan-out area. The fan-out area includes a straight line portion 11. The fan-out wire 20 includes a first straight line segment 21 disposed in the straight line portion 11, blocking members 30 are disposed in the straight line portion 11, and the blocking members 30 block the flow of the liquid. The blocking members 30 are disposed in the straight line portion 11 of the fan-out area on one side of the substrate disposed with the active switches to block the flow of the liquid by the blocking members 30 and to solve the problem, in which the straight line portion 11 has a large layout gap and an empty location to cause the easy expansion of the liquid that cannot be precisely controlled. Thus, it is possible to effectively block the reflow of the liquid for forming an alignment film, prevent the liquid from entering the display area, and improve the display taste and reliability.

The blocking member 30 is provided by using a single layer metal; the blocking member 30 is provided by using a double layer metal; the blocking member 30 is provided by using an amorphous silicon layer; or the blocking member 30 is provided by using a pixel electrode layer. Using the material forming the active switches facilities the material utilization, and has the high process availability.

In another embodiment of this disclosure as shown in FIGS. 1-7, the display panel includes: a first substrate, wherein a color filter layer is disposed on the first substrate; and a second substrate, wherein active switches are disposed on the second substrate. The second substrate includes a display area and a fan-out (fan-out) area. Fan-out wires 20 are disposed in the fan-out area. The fan-out area includes a straight line portion 11. The fan-out wire 20 includes a first straight line segment 21 disposed in the straight line portion 11, blocking members 30 are disposed in the straight line portion 11, and the blocking members 30 block the flow of the liquid. The blocking members 30 are disposed in the straight line portion 11 of the fan-out area on one side of the substrate disposed with the active switches to block the flow of the liquid by the blocking members 30 and to solve the problem, in which the straight line portion 11 has a large layout gap and an empty location to cause the easy expansion of the liquid that cannot be precisely controlled. Thus, it is possible to effectively block the reflow of the liquid for forming an alignment film, prevent the liquid from entering the display area, and improve the display taste and reliability.

In one embodiment, a configuration location 40 for an arrangement of the blocking member 30 is between neighboring two of the first straight line segments 21, and the blocking member 30 is disposed on a protrusion or a recessed groove of the configuration location 40. The blocking member 30 can be configured as an "S" shape, and the blocking members 30 are successively connected together and disposed along a direction of the first straight line segment 21.

The blocking member 30 may be provided by using the second straight line segment. An extension line of the second straight line segment and an extension line of the first straight line segment 21 are crossly disposed according to a predetermined angle therebetween, wherein the angle does not include 90°. Meanwhile, the tilt angles of blocking members 30 are the same.

The blocking member 30 is provided by using the second straight line segment, wherein an extension line of the second straight line segment and an extension line of the first straight line segment 21 are crossly disposed according to a predetermined angle, and the angle is equal to 90 degrees.

The blocking member 30 is provided by using the second straight line segment, wherein an extension line of the second straight line segment and an extension line of the first straight line segment 21 are crossly disposed according to a predetermined angle. The arrangement directions of the blocking member 30 corresponding to the horizontally neighboring $(N-1)^{th}$ configuration location 40 and the blocking member 30 corresponding to the $N^{th}$ configuration location 40 are different from each other. The arrangement directions of the blocking member 30 corresponding to the $(N-1)^{th}$ configuration location 40 and the blocking member 30 corresponding to the $(N+1)^{th}$ configuration location 40 are the same. The blocking members 30 corresponding to neighboring two configuration locations 40 form an acute angle and an obtuse angle with the horizontal line.

The above-mentioned blocking members 30 that may be adopted may be used independently or in the combination form.

The blocking member 30 is provided by using a single layer metal; the blocking member 30 is provided by using a double layer metal; the blocking member 30 is provided by using an amorphous silicon layer; or the blocking member 30 is provided using a pixel electrode layer. Using the material forming the active switches facilities the material utilization, and has the high process availability.

In the above embodiments, the display panel includes a liquid crystal display panel, an OLED display panel, a QLED display panel, a plasma display panel, a flat display panel, a curved display panel, or the likes, and this disclosure is not limited.

Figure 8:
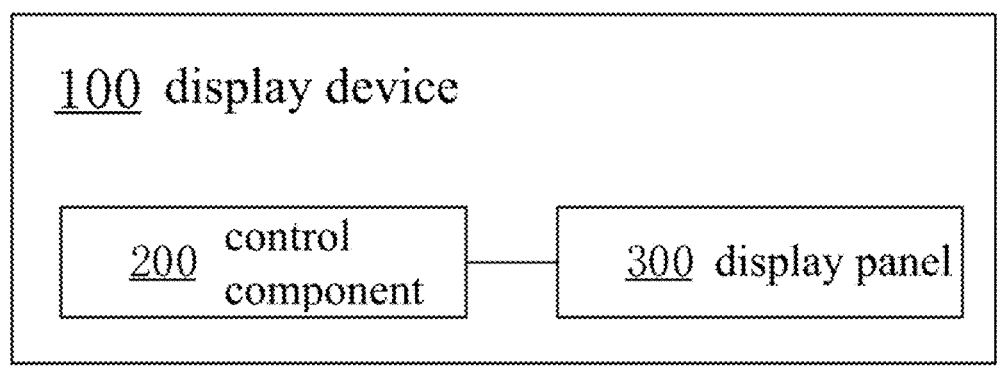
FIG. 8 is a schematic view showing the display device of an embodiment of this disclosure.

Referring to FIG. 8, this implementation method discloses a display device 100. The display device 100 includes a control component 200 and a display panel 300 of this disclosure. The display panel is taken as an example to be described in detail hereinabove. It is to be described that the above-mentioned description of the structure of the display panel is also applicable to the display device of an embodiment of this disclosure. When the display device of an embodiment of this disclosure is a liquid crystal display, the liquid crystal display includes a backlight module, and the backlight module can be used as a light source for supplying the light source with sufficient brightness and uniform distribution. The backlight module of this embodiment may pertain to the front lighting type and the backlight type. It is to be described that the backlight module of this embodiment is not limited thereto.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A display panel, comprising:
a first substrate, wherein a color filter layer is disposed on the first substrate; and
a second substrate, wherein active switches are disposed on the second substrate;
wherein the second substrate comprises a display area and a fan-out area, and a plurality of fan-out wires are disposed in the fan-out area, and the fan-out area comprises a straight line portion, and the fan-out wire comprises a first straight line segment disposed in the straight line portion, and a plurality of blocking members are disposed in the straight line portion, and the blocking members block a flow of a liquid,
wherein a configuration location for an arrangement of the blocking member is between neighboring two of the first straight line segments, and the blocking member is disposed on a protrusion of the configuration location,
wherein the blocking member is provided by using a second straight line segment, and an extension line of the second straight line segment and an extension line of the first straight line segment are crossly disposed according to a predetermined angle,
wherein arrangement directions of the blocking member corresponding to a horizontally neighboring $(N-1)^{th}$ configuration location and the blocking member corresponding to an $N^{th}$ configuration location are different from each other, and the arrangement directions of the blocking member corresponding to the $(N-1)^{th}$ configuration location and the blocking member corresponding to an $(N+1)^{th}$ configuration location are the same; and
the blocking members corresponding to neighboring two of the configuration locations form an acute angle and an obtuse angle with the horizontal line.

2. The display panel according to claim 1, wherein a configuration location for an arrangement of the blocking member is between neighboring two of the first straight line segments, and the blocking member is disposed on a recessed groove of the configuration location.

3. The display panel according to claim 1, wherein the blocking member is configured as an "S" shape, and the blocking members are successively connected together and disposed along a direction of the first straight line segment.

4. The display panel according to claim 1, wherein the angle is equal to 90 degrees.

5. The display panel according to claim 1, wherein the blocking member is provided by using a single layer metal;
the blocking member is provided by using a double layer metal;
the blocking member is provided by using an amorphous silicon layer; or
the blocking member is provided by using a pixel electrode layer.

6. The display panel according to claim 1, wherein the blocking members in the two neighboring configuration locations form an inverse-V shaped overall form.

7. The display panel according to claim 1, wherein the blocking members intersecting the first straight line segment are continuously or separately disposed in the corresponding configuration locations, or combined with other blocking members.

8. The display panel according to claim 1, wherein tilt angles of the blocking members are the same.

9. A display panel, comprising:
a first substrate, wherein a color filter layer is disposed on the first substrate; and
a second substrate, wherein active switches are disposed on the second substrate;
wherein the second substrate comprises a display area and a fan-out area, and a plurality of fan-out wires are disposed in the fan-out area, and the fan-out area comprises a straight line portion, and the fan-out wire comprises a first straight line segment disposed in the straight line portion, and a plurality of blocking members are disposed in the straight line portion, and the blocking members block a flow of a liquid;
wherein a configuration location for an arrangement of the blocking member is between neighboring two of the first straight line segments, and the blocking member is disposed on a protrusion or a recessed groove of the configuration location;
wherein the blocking member is configured as an "S" shape, and the blocking members are successively connected together and disposed along a direction of the first straight line segment; or the blocking member is provided by using a second straight line segment, and an extension line of the second straight line segment and an extension line of the first straight line segment are crossly disposed according to a predetermined angle; and
wherein the blocking member is provided by using a single layer metal;
the blocking member is provided by using a double layer metal;
the blocking member is provided by using an amorphous silicon layer; or
the blocking member is provided by using a pixel electrode layer,
wherein arrangement directions of the blocking member corresponding to a horizontally neighboring $(N-1)^{th}$ configuration location and the blocking member corresponding to an $N^{th}$ configuration location are different from each other, and the arrangement directions of the blocking member corresponding to the $(N-1)^{th}$ configuration location and the blocking member corresponding to an $(N+1)^{th}$ configuration location are the same; and
the blocking members corresponding to neighboring two of the configuration locations form an acute angle and an obtuse angle with the horizontal line.

10. The display panel according to claim 9, wherein the angle is equal to 90 degrees.

11. The display panel according to claim 9, wherein the blocking members in the two neighboring configuration locations form an inverse-V shaped overall form.

12. The display panel according to claim 9, wherein the blocking members intersecting the first straight line segment are continuously or separately disposed in the corresponding configuration locations, or combined with other blocking members.

13. The display panel according to claim 9, wherein tilt angles of the blocking members are the same.

\* \* \* \* \*